United States Patent [19]
Rollwitz et al.

[11] Patent Number: 5,151,695
[45] Date of Patent: Sep. 29, 1992

[54] TELEMETRIC MEASURING DEVICE WITH HIGH POWER GENERATION

[75] Inventors: William L. Rollwitz; Armando De Los Santos; William D. Perry; Robert W. Burrahm; James K. Davis, all of San Antonio, Tex.

[73] Assignee: Southwest Research Institute, San Antonio, Tex.

[21] Appl. No.: 591,952

[22] Filed: Oct. 2, 1990

[51] Int. Cl.⁵ .................. G08C 19/06; H02K 11/00
[52] U.S. Cl. .................. 340/870.33; 310/15; 340/870.3
[58] Field of Search ........... 340/870.33, 870.3, 870.13, 340/870.16, 870.26, 870.17; 324/207.15, 174; 331/65, 66, 60; 322/3; 310/15; 307/116, 125; 361/143

[56] References Cited

U.S. PATENT DOCUMENTS

| | | | |
|---|---|---|---|
| 3,534,728 | 10/1970 | Barrows | 340/870.17 |
| 3,596,262 | 7/1971 | Rollwitz et al. | 340/870.37 |
| 3,696,251 | 10/1972 | Last | 310/15 |
| 3,766,535 | 10/1973 | Deebel | 340/870.26 |
| 3,824,857 | 7/1974 | Smith | 340/870.33 |
| 4,875,042 | 10/1989 | Oku | 340/870.13 |
| 4,881,071 | 11/1989 | Monterosso | 340/870.13 |
| 4,945,269 | 7/1990 | Kamm | 310/15 |

*Primary Examiner*—Donald J. Yusko
*Assistant Examiner*—Michael Krakovsky
*Attorney, Agent, or Firm*—Baker & Botts

[57] ABSTRACT

A telemetric measuring device for measuring physical conditions of machinery having a periodically moving part. The device generates its own power with power generator that uses the periodic motion of the machinery to move a reciprocator slug inside a coil, and thereby opening and closing a magnetic circuit and generating a continuous alternating current. This current powers a transmitter that receives output from a multi-channel switch for a number of sensors. The transmitter delivers a radio frequency signal, whose frequency is a function of the condition being measured.

21 Claims, 5 Drawing Sheets

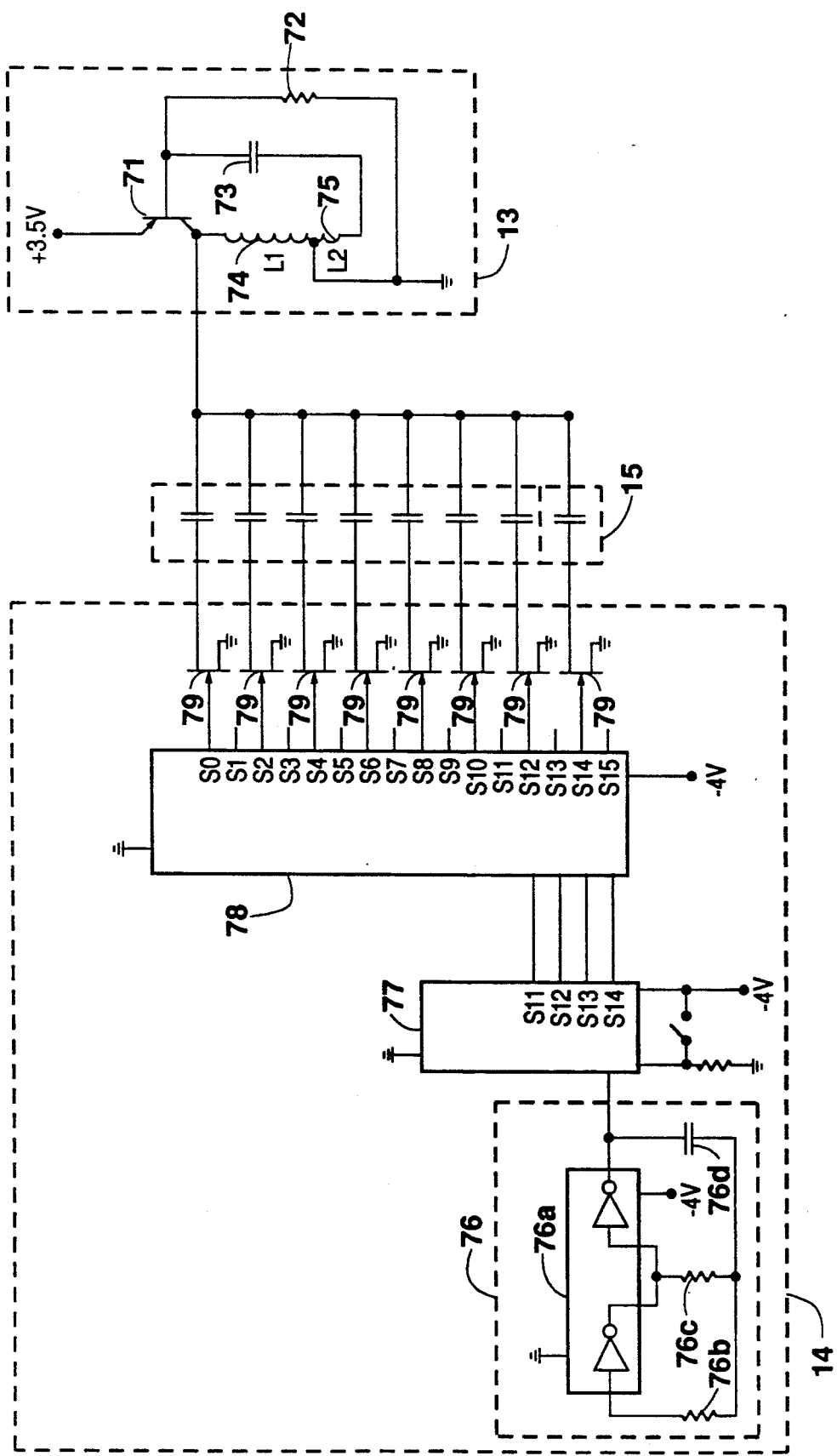

TELEMETRIC MEASURING DEVICE WITH HIGH POWER GENERATION

TECHNICAL FIELD OF THE INVENTION

This invention relates to telemetric measuring devices, and more particularly to a device for measuring physical conditions of machinery, which uses inertial forces derived from the machinery's motion to generate power for a multi-channel transmitter.

BACKGROUND OF THE INVENTION

Telemetry may be defined as the science of sensing information at some remote point-of-measurement location and transmitting data representing the sensed information to a convenient receiving station to be analyzed. In a common type of telemetric measuring system, appropriate sensors are used to acquire data at the point of measurement, and the data is converted to a radio frequency signal, which is transmitted to a receiver at the user station.

One application of telemetry is the measurement of physical conditions, such as temperature, stress, and pressures, in mechanical engines. This application presents special problems. The engine motion tends to result in hostile conditions, such as high temperature and shock. Also, many engines have limited space for installing the measuring device.

As with other measuring devices, the transducers used for telemetric measuring devices can be either "passive" in the sense that they derive energy from the measurand, or "active" in the sense that they derive energy from a power source. Most active transducers rely on power from a battery or other conventional power source external to the measurand.

A self-powered active telemetric measuring device, that measures physical conditions associated with machinery, is described in U.S. Pat. No. 3,596,262. It has a power generator that uses the motion of the machinery to sling a magnet back and forth, thereby generating alternating electrical current. Power from this current is used in a transmitter circuit, having an oscillator whose frequency is a function of the parameter being measured. A capacitor, used as a tuning capacitor in the transmitter circuit, changes its capacitance according to temperature.

A design consideration in telemetric measuring devices, such as that described in U.S. Pat. No. 3,596,262 and others, is the variety of measured data that may be acquired. It would be advantageous to provide a measuring device that acquires temperature data from more than one sensor point or acquires two different types of data, such as temperature and pressure. Thus, there is a need for a telemetric measuring device having a number of input channels, each receiving different sensed data. Ideally, the device must operate at high temperatures, withstand high acceleration forces, and be durable and easily installed.

SUMMARY OF THE INVENTION

One aspect of the invention is a power generator for a telemetric measuring device. The power generator converts the motion of a moving part of machinery, such as a piston, to electrical power that feeds a transmitter. More specifically, the power generator has a reciprocating slug that moves in response to inertial forces from the piston motion. The slug moves inside a coil and opens and closes a magnetic circuit, thereby producing a pulsed current, which may be made continuous by means of appropriate filtering.

Another aspect of the invention is a telemetric measuring device that includes a power generator that operates in response to inertial forces of the moving part. In addition to the power generator of the preceding paragraph, the device has a transmitter that uses a component of an oscillator circuit as a sensor, which changes its value with a physical condition being measured. The changing value of the sensing component causes variations in frequency of the transmitter circuit. The power is sufficient to power a multi-channel switch that controls a number of sensors.

A technical advantage of the invention is that various physical conditions of machinery may be measured while the machinery is in operation. The device withstands harsh environments, and is especially useful for piston measurements. The device is self powered, with a power output sufficient for multiple channels, but has a small size and mass.

BRIEF DESCRIPTION OF THE DRAWINGS

FIG. 7 is a schematic diagram of the transmitter, multi-channel switch, and sensor of the measuring device.

DETAILED DESCRIPTION OF THE INVENTION

Figure 1:
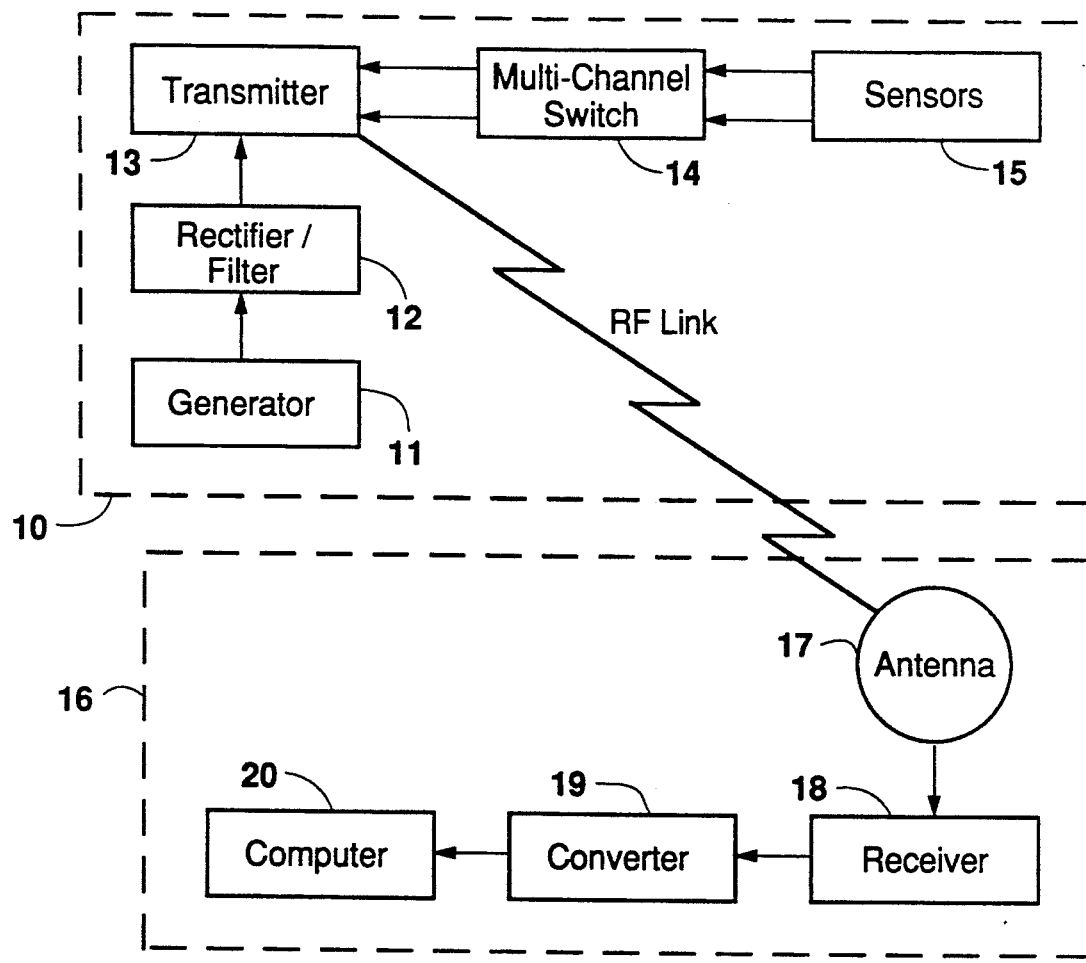
FIG. 1 is a block diagram of a telemetric measuring system.

FIG. 1 is a block diagram of a telemetric measuring system that includes not only the telemetric measuring device 10, but also a receiving station 16. A radio frequency link carries a signal representing sensed data from the measuring device 10 to the receiving station 16.

Measuring device 10 is comprised of a magnetic power generator 11, rectifying and filtering circuit 12, transmitter 13, multi-channel switch 14, and sensors 15. The device 10 shown in FIG. 1 is used for measuring temperature, and thus, as explained below, sensors 15 are capacitive components suitable for that purpose. However, the inventive concepts described herein could be easily modified for a measuring device 10 having some other type of sensors 15.

Receiving station 16 is comprised of an antenna 17, a receiver 18, a converter 19, and a computer 20. Computer 20 is used for relatively sophisticated systems; simpler forms of display and record devices may be used instead of computer 20 for systems having less sophisticated data processing.

Figure 2:
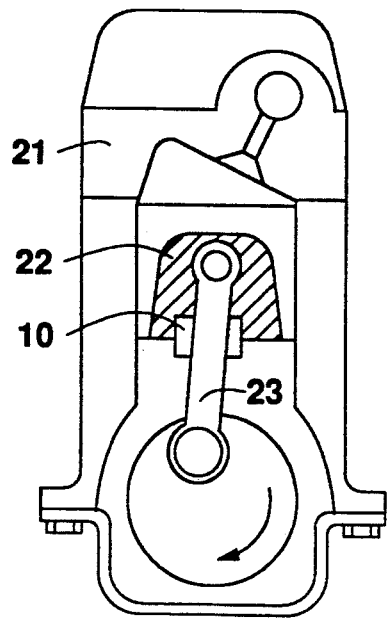
FIG. 2 illustrates the connection between the measuring device of FIG. 1 and a piston of machinery whose conditions are to be measured.

FIG. 2 illustrates the relationship between the measuring device 10 and an engine 21 having a piston 22 and a crankshaft 23. In the example of this description, the entire measuring device 10 is attached to piston 22.

However, as explained below, this is not necessary to the invention, and the measuring device 10 is operable if only power generator 11 is attached to piston 22. Also, although piston 22 is typically part of an internal combustion engine, the same principles may be applied to other machinery having a part with periodic or reciprocating motion, or with some other motion that may be translated to periodic or reciprocating motion. Various means for translating engine motion to inertial motion are described in U.S. Pat. No. 3,596,262, which is referred to above in the background section of this patent application.

Figure 3A:
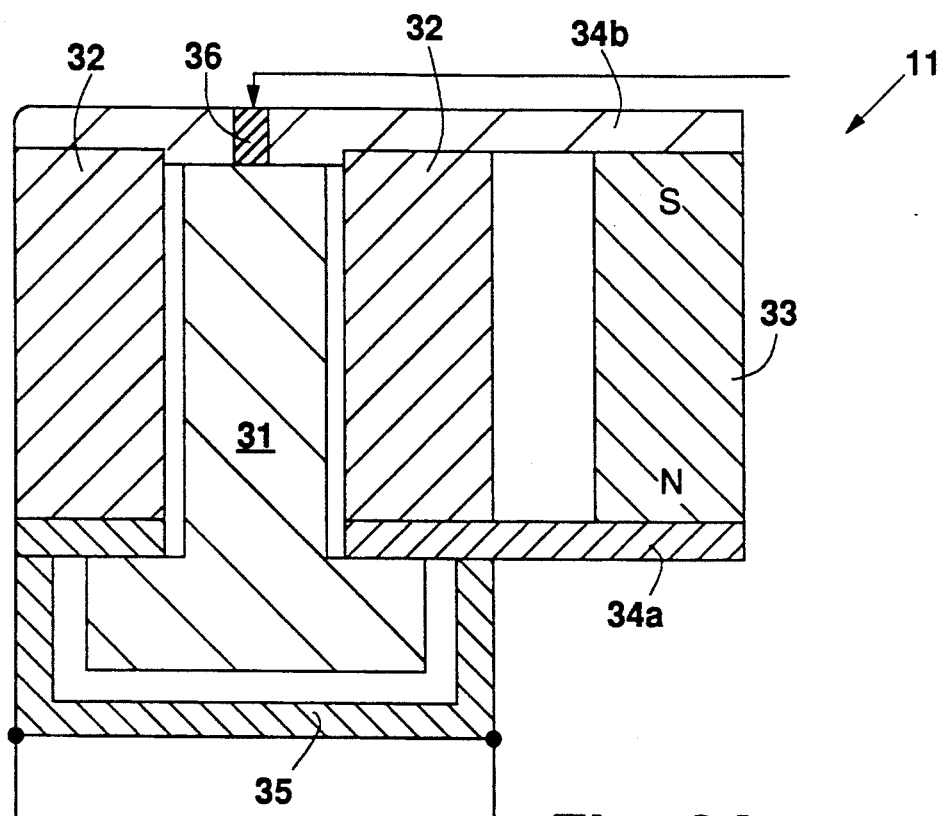
FIGS. 3A and 3B illustrate the power generator of the measuring device.
Figure 3B:
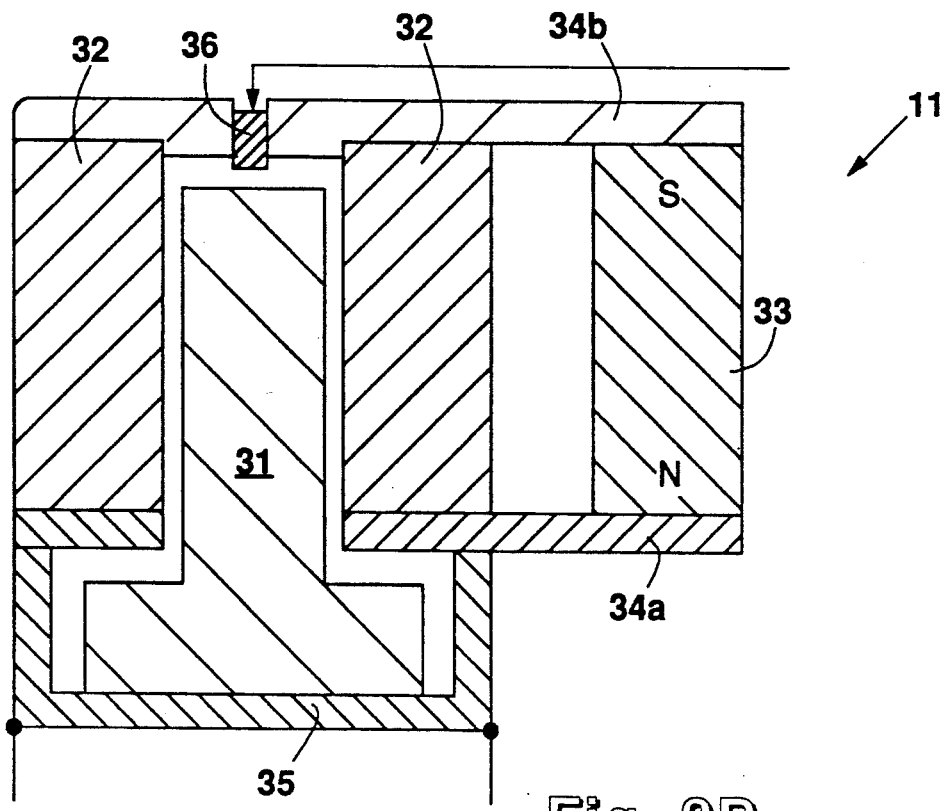

FIGS. 3A and 3B show power generator 11 in further detail, and illustrate how power generator 11 comprises a magnetic circuit in a closed and an open position, respectively. Power generator 11 is attached to piston 22 so that it moves with piston 22.

A power generator housing 34, contains a reciprocator slug 31, a coil 32, and a magnet 33. Housing 34 is made from magnetically conductive material, as is slug 31, so that slug 31, magnet 33, and housing 34 form a magnetic circuit when slug 31 is in a certain position. In the embodiment of this description, housing 34 is comprised of two plates 34a and 34b, between which magnet 33 and coil 32 are placed.

Reciprocator slug 31 is placed within coil 32, but is not fixed. Slug 31 has a range of movement inside coil 32 that is limited at both ends. In the embodiment of this description, housing 34 permits slug 31 to extend into an end piece 35, which is also made from a magnetically conductive material. An air gap, which represents the difference between the range of movement of slug 31 and its length, is small compared to the overall length of power generator 11. For example, the air gap would be approximately 0.020 inches to 0.050 inches, as compared to an overall length of housing 34 of about 0.5 inches.

In operation, the motion of piston 22 is inertially translated to reciprocator slug 31. More specifically, slug 31 is actuated by the acceleration and deceleration of piston 22 during a rotation of the engine crankshaft 23, so that it moves back and forth inside coil 32. This motion of slug 31 repeatedly opens and closes the magnetic path formed by slug 31, magnet 33, plates 34a and 34b, and end piece 35. The effect is same as that motion of a magnet moving inside a coil, and thus produces a continuous alternating current. A push rod 36, explained below in connection with FIG. 4, may be used to offset the magnetic force on slug 31.

The shape of slug 31 resembles a cylinder with an enlarged cap. This is preferable to a cylindrical shape because it increases the amount of flux change for a given distance of travel. More specifically, as slug 31 moves, two air gaps in the magnetic circuit are produced, making an effective air gap of two times the stroke. This produces a greater change in magnetic flux in the circuit for a given stroke length. Thus, slug 31 need not travel as far to produce the same amount of power as a cylindrical shape. Reducing the amount of travel reduces the stress on slug 31 and increases the durability of measuring device 10. Also, the cap portion of slug 31 provides a large surface area on which to distribute compressive loads caused by slug 31 impacting housing 34 and end piece 36 at either end of its stroke.

FIGS. 3A and 3B illustrate power generator oriented with respect to piston 22 such that the cap of slug 31 is facing downward, in the same direction as the downward stroke of piston 22. However, because the motion of slug 31 is inertial and not gravitational, power generator 11 may be oriented so that the cap of slug 31 is upward. The basic operation of measuring device 10 is the same.

Figure 4:
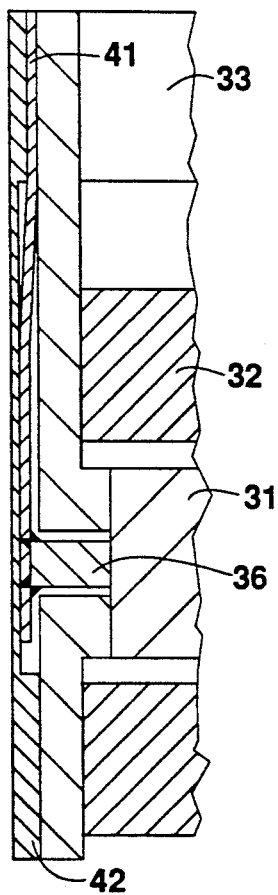
FIG. 4 illustrates one method of counteracting the magnetic force on a reciprocating slug used in the power generator.

FIG. 4 illustrates a means for offsetting the magnetic forces on slug 31, which permits power generator 11 to operate at lower revolutions per minute (rpm) of piston 22. A push rod 36 is attached to a helper spring 41, which is attached to piston 22 and protected within a spring housing 42. During operation, push rod 36 and helper spring 41 lower the break-away speed required to allow slug 31 to overcome the magnetic attraction and begin to move. In the embodiment of this description, the starting rpm of power generator is about 1800 rpm. Design adjustments can be easily made to change the offset force for other desired rpm values. In alternate embodiments of the invention, helper spring 41 could be replaced with a pneumatic compartment or elastic material, which would also provide an offsetting force to counteract the magnetic forces on slug 31.

Figure 5:
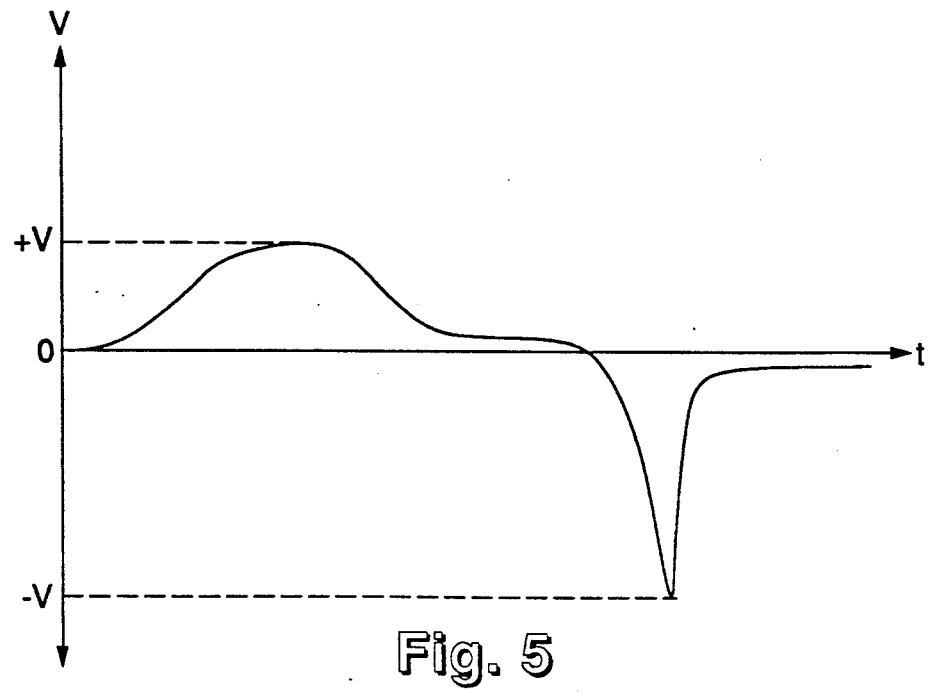
FIG. 5 illustrates the output of the power generator.

FIG. 5 illustrates the output of power generator 11. As illustrated, the power is a continuous, dual supply signal. The positive and negative magnitudes are non symmetrical, with the magnitude of the negative voltage being larger than the magnitude of the positive voltage. This design meets the demands of transmitter 13, which as explained below, requires a difference in negative and positive supply magnitudes. Thus, power generator delivers a wide positive pulse that is low in amplitude and a narrow negative pulse that is high in amplitude. This permits the generation of a high current, low magnitude positive supply, and a low current, high magnitude negative supply. An example of coil 32 for producing this output has 3000 turns.

Figure 6:
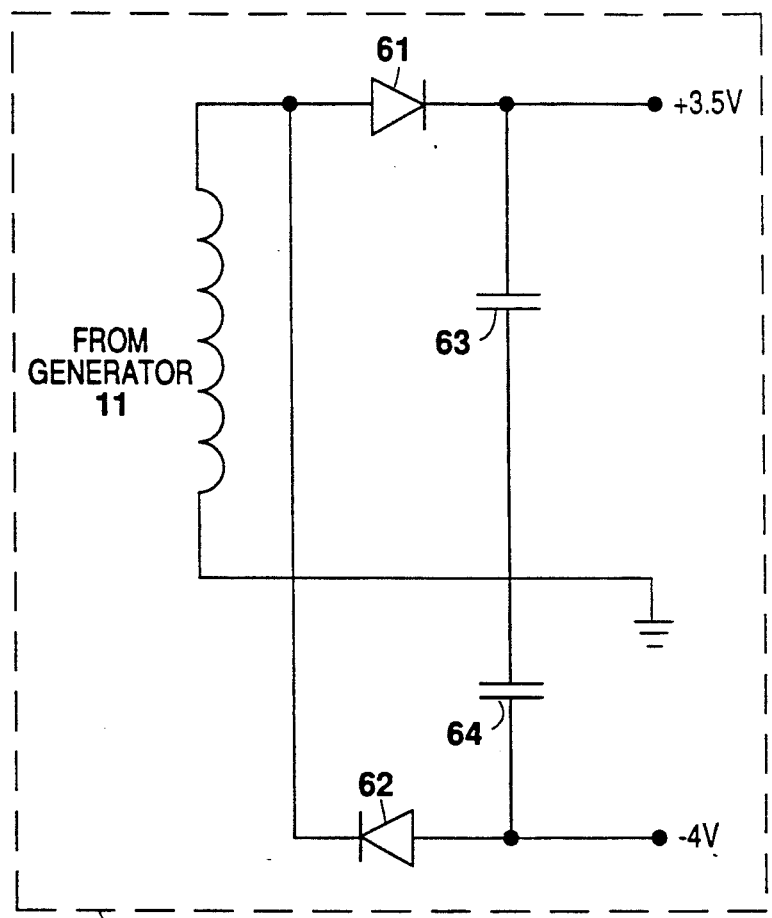
FIG. 6 is a schematic diagram of the rectifying and filtering circuit of the the measuring device.

FIG. 6 is a schematic diagram of rectifying and filtering circuit 12. As shown, rectifying and filtering circuit 12 comprises diodes 61 and 62 and capacitors 63 and 64. Example values for the capacitors 63 and 64 are 22 microfarads and 10 microfarads for the positive and negative supplies, respectively. The output of rectifying and filtering circuit 12 is a continuous positive and negative DC power throughout the entire cycle of piston 22. In the example of this description, rectifying and filtering circuit 12 provides a minimum of +3.5 and −4 VDC. The positive 3.5 VDC is used for transmitter 13, and the negative 4 VDC is used for switch 14. The current draw for transmitter 13 is much higher than for switch 14.

FIG. 7 is a schematic diagram of transmitter 13, multi-channel switch 14, and sensors 15. Switch 14 and sensors 15 are configured for eight channels, but may be easily modified for more or fewer channels.

Transmitter 13 is, in the preferred embodiment, a modified single-transistor blocking oscillator. It receives positive and negative DC power from rectifying and filtering circuit 12. The embodiment of FIG. 7 is an inductance/capacitance tuned circuit that permits an inductance component to be the transmitting antenna 17 and a capacitance component to be a sensor 15.

Figure 8:
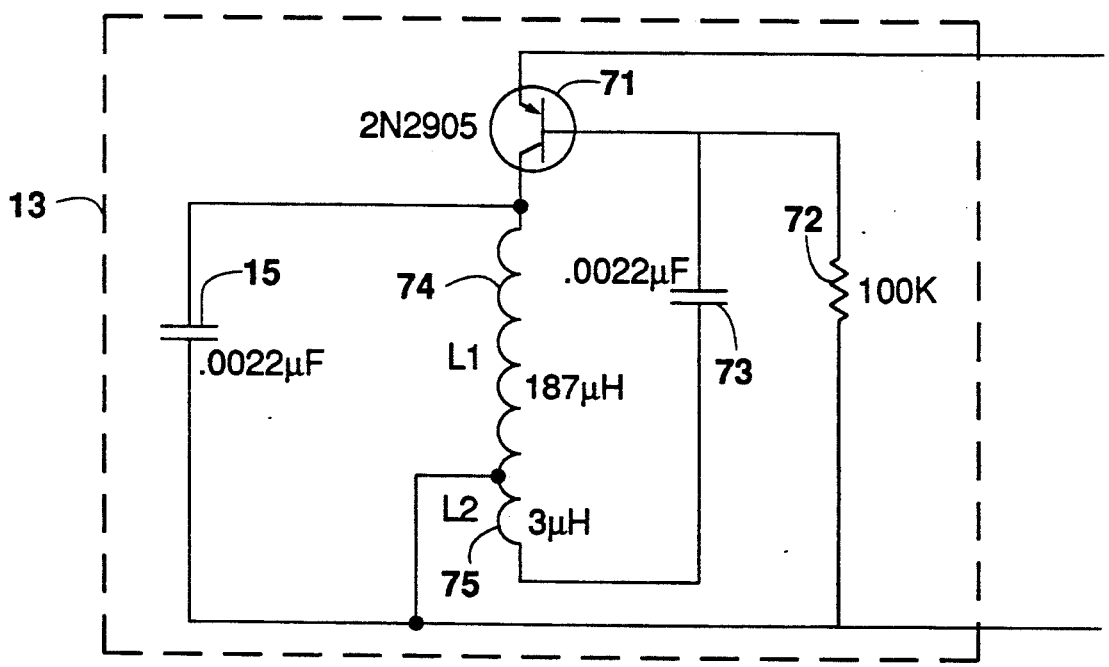
FIG. 8 illustrates the transmitter in further detail.

FIG. 8 illustrates the blocking oscillator of transmitter 13, with example values for each component. As shown, transmitter 13 is comprised of transistor 71, bias resistor 72, feedback capacitor (C2) 73, primary inductor (L1) 74, tuning capacitor (C1) 15, and feedback inductor (L2) 75. Inductors L1 74 and L2 75 are used for antenna 17. A tuning capacitor 15 is used for each sensor/capacitor 15. The oscillator is different from usual oscillators because of sensor/capacitor 15 added across L1 74, when switched by switch 14.

The oscillator's frequency may be expressed as:

$$(2\pi f)^2 = \frac{(R_0 + R_1) R_L}{(L_1 L_2 - M^2) + C_1 R_0 (L_1 R_L + L_2 R_1)}$$

, where $R_L$ is the parallel combination of the input resistance of transistor 71 and bias resistor 72, $R_1$ is the resistance of L1 74, $R_0$ is the output resistance of transistor 71, and M is the mutual inductance between L1 74 and L2 75.

For best operation with a low transistor gain, the value of $(L1L2-M^2)$, is small. The oscillator frequency may then be expressed as:

$$(2\pi f)^2 = \frac{(R_0 + R_1) R_L}{C_1 R_0 (L_1 R_L + L_2 R_1)}$$

Because R1 is much less than R0 and R1, the frequency is approximately:

$$(2\pi f)^2 = \frac{1}{C_1 L_1}$$

When the oscillator is driven into saturation and cut off by the feedback from L1 74 to L2 75, it is working in its relaxation mode, and the value of the time constant, as derived from C2 and R1, controls the repetition frequency of the pulses.

Thus, with a large coupling factor, M, any one of three values may be used to control the pulse repetition frequency: C1, C2, and R2. The value of C1 controls frequency when the bias is such that the oscillator is not in its relaxation mode. The values of C2 and R2 control frequency in the relaxation mode. If C2 or R2 are used to control frequency, the frequency variation will vary as the square root of the variation of C2 or R2.

Multi-channel switch 14 permits transmitter 13 to sequentially switch among sensors 15 at regular time intervals. Switch 14 is comprised of a clock 76, a counter 77, a decoder 78, and transistor switches 79. Clock 76 is a dedicated oscillator having an invertor circuit 76a, an example of which is the commercially available CD4069 circuit, resistors 76b and 76c, and capacitor 76d. Counter 77 is clocked at 772.2 Hz in the example of this description. An example of counter 77 is the commercially available CD4020, a 14-stage ripple-carry binary counter/divider. Four outputs of counter 77, S11, S12, S13, and S14, are fed into decoder 78. Decoder 78 is a 4-to-16 line decoder, commercially available as a 4-bit latched line decoder CD4514. The use of four outputs of counter 77 divides the clock rate by 512, which causes decoder 78 to have a channel switching rate of approximately 1.5 seconds.

Every other output of decoder 78 is connected to the gate of a transistor switch 79. In the preferred embodiment, each switch 79 is a junction field effect transistor (JFET). Each switch 79 is connected at one end to multi-channel switch 14 and at another end to a sensor 15. More specifically, switches 79 are configured as in-line switches by having their source connected to ground and their drain connected to one end of a sensing capacitor 15. An example of a suitable transistor for transistor switch 79 is the 2N5434, which has a low cut-off value. As explained below, the 0.5 VDC difference in voltage magnitudes of transmitter 13 and multi-channel switch 14 biases switches 79. Each switch 79 is off during the off stage of its associated capacitor/sensor 15.

As explained above, sensors 15 are capacitor components of the oscillator circuit of transmitter 13. Each sensor 15 is characterized by having a capacitance that varies with the condition being measured. One end of each sensor 15 is connected to a switch 79, and the other end to transistor 71 of transmitter 13.

For measuring temperature, a sensor 15 having a change in capacitance as a function of temperature is used. Capacitors that use ferro-electric material with a high dielectric constant exhibit not only a change in capacitance caused by dimensional changes in the dielectric material with temperature, but also a large change in the dielectric constant. In the example of FIG. 8, the capacitance changes from C0, the value at 25 degrees centigrade, to about ¼C0 at 85 degrees centigrade.

Examples of other conditions that the invention is useful for measuring are piston ring motion, ring land pressure, strain, and oil film thickness. Capacitance changes can also be used to measure distance. For example, ring motion can be related to changing capacitance by using a ring or piston 22 as one plate of a capacitor. Also, the inductive or resistive elements of the oscillator circuit of transmitter 13, whose values change with other physical conditions, may be used to change the resonance of the oscillator circuit.

In operation, transmitter 13 transmits three types of frequencies: reference, switching, and measured data. Beginning with S0 on decoder 78, every other output of decoder 78 is connected to the gate of a transistor switch 79. When S0 becomes active, it pulls the gate of transistor switch 79 to 0 VDC, and causes its associated sensor/capacitor 15 to be strapped across L1 74 for 1.5 seconds. The frequency of transmitter 13 then becomes dependent on the value of the associated sensor/capacitor 15. As decoder 78 switches to the next output, i.e., S1, the gate of S0 is pulled to −4 VDC causing it to open the connection to ground of sensor/capacitor 15. S1 is an open connection that remains for 1.5 seconds. The open outputs of decoder 78 cause all sensors/capacitors 15 to be open, and causes transmitter 13 to transmit a higher frequency of approximately 1 MHz. This signal is used to indicate that a channel switch is being made. This process continues, with alternating transistor switches 79 being used to indicate a measured value or that switching is in process.

The above switching scheme gives transmitter 13 an 8 channel capability, with seven sensor/capacitors 15 used for acquired measured data. The eighth sensor/capacitor 15 is a reference capacitor having a stable and low temperature coefficient. This eighth sensor/capacitor 15 provides a constant frequency regardless of the condition being measured by the other sensor/capacitors 15, and thus provides a starting point so that the user can identify which sensor/capacitor 15 is in-circuit.

Referring again to the system block diagram of FIG. 1, transmitter 13 delivers a radio frequency signal to receiver 18 via antenna 17. Antenna 17 is an 8 turn coil, consisting of a solid strand of enameled wire. In internal combustion applications, it may be installed in an oil pan, and a coaxial cable routed from the antenna to receiver 18.

Receiver 18 includes an amplifier circuit for conditioning the signal received from transmitter 13. The amplifier band width limits and boosts the signal to an adequate level for correct operation of the frequency to voltage converter 19.

Receiver 18 also includes a means for converting the transmitted frequency to an analog signal. In the preferred embodiment, this is accomplished with a single-phase-locked loop circuit. Such a circuit is commercially available as an integrated circuit, designated as the CD4046. When the conditioned signal is applied to the input of the phase locked loop, it is compared to an internal voltage controlled oscillator (VCO) signal. The phase comparison generates an error signal that is fed back into the VCO, and forces the phase difference to zero. When the phase difference is zero, the oscillator is locked into the input signal and continually tracks the change of the input frequency. As the input signal changes frequency, the VCO's error signal also changes correspondingly. Thus, the converted analog voltage read by computer 20 is the error signal of the VCO.

The voltage output of receiver 18 is sampled by computer 20, which contains an analog-to-digital conversion circuit. Computer 20 then uses a comparison table and conversion algorithm to process the sampled voltage. The result is a display or printed output showing channels 1 through 8. Channels 1 through 7 indicate sensed data, such as temperature. Channel 8 shows the reference frequency.

Receiver 18 and computer 20 work together so that no manual tuning is required. In the example of this description, the reference frequency is 180 KHz and does not change with temperature. When receiver 18 detects this signal, it informs computer 20 that transmitter 13 is at channel 0. Switching frequency is 1 MHz, and signifies that transmitter 13 is between channels, so that computer 20 is informed that a channel change is in process. Measured data frequencies are in a range of 240 KHz to 500 KHz. In the embodiment described herein, in which the measured data is temperature and the frequency depends on capacitance values of sensors 15, computer 20 stores the temperature characteristic curves of the capacitors of sensors 15, as well as programming for converting the signal to a temperature value.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A power generator for a telemetric measuring device for measuring physical conditions of machinery having a moving part, comprising:
   a magnet for energizing a magnetic circuit, said magnet being fixed with respect to said moving part;
   a coil for providing induced electrical current, said coil being fixed with respect to said moving part; and
   a reciprocator slug, made from a magnetically conductive material, placed inside said coil and moveable with respect to said magnet and said coil, such that said slug is free to move in response to inertial forces provided by said moving part, thereby opening and closing said magnetic circuit and inducing an electrical current in said coil.

2. The power generator of claim 1, and further providing a means for offsetting the magnetic force on said slug.

3. The power generator of claim 1, wherein said means for offsetting the magnetic force comprises a spring attached to said moving part.

4. The power generator of claim 1, wherein said slug has an enlarged cap portion outside said coil.

5. The power generator of claim 1, wherein said power generator generates continuous power while said moving part is in motion.

6. The power generator of claim 1, wherein said power generator generates a positive signal and a negative signal of different magnitudes.

7. A telemetric measuring device for measuring physical conditions of machinery having a periodically moving part, comprised of:
   a power generator having a coil, a magnet, and a reciprocator slug, wherein said magnet and said coil are fixed with respect to said machinery and said reciprocator slug is made from a magnetically conductive material and is moveable inside said coil such that it may move inertially in response to the motion of said moving part, wherein said reciprocator slug opens and closes a magnetic circuit formed at least in part by said magnet and said reciprocator slug as it moves;
   a rectifying circuit connected to said coil for rectifying the signal generated by said power generator;
   a transmitter, powered by said power generator and connected to said rectifier, for transmitting electrical signals; and
   at least one sensor for acquiring data representing a physical condition of said machinery.

8. The power generator of claim 7, and further providing a means for offsetting the magnetic force on said slug.

9. The measuring device of claim 7, wherein said transmitter is a blocking oscillator circuit and said sensor is a component of said oscillator circuit.

10. The measuring device of claim 7, and further comprising a multi-channel switch powered by said power generator for acquiring data from multiple sensors and for delivering a selected channel of said data to said transmitter.

11. A telemetric measuring system for measuring physical conditions of machinery having a moving part, comprised of:
   a measuring device having a magnetic power generator having a coil, a magnet, and a reciprocator slug, wherein said magnet and said coil are fixed with respect to said machinery and said reciprocator slug is moveable inside said coil such that it moves in response to the motion of said moving part, wherein said reciprocator slug is made from a magnetically conductive material and opens and closes a magnetic circuit formed at least in part by said magnet and said reciprocator slug as it moves; a rectifying circuit connected to said coil for recitfying the signal generated by said power generator; a transmitter connected to said rectifier for transmitting electrical signals; a multi-channel switch for acquiring data from multiple sensors and for delivering a selected channel of said data to said transmitter; and a sensing unit having a number of sensors, each for acquiring data representing a physical condition of said machinery;

an antenna for receiving said transmitted signals at a remote location;

a receiver for detecting a frequency of said signal; and a converter for converting said frequency to data representing a measured value.

12. A method of measuring physical conditions associated with machinery having a moving part, comprising the steps of:

attaching a magnet and a coil to a moving part of machinery;

placing a reciprocating slug made from a magnetically conductive material inside said coil;

generating power for a transmitter, using said slug to open and close a magnetic circuit, which is formed at least in part by said magnet and said slug, in response to motion of said moving part, while said coil and said magnet remain stationary;

acquiring data from a first sensor of said measuring device;

converting said data to a radio frequency signal; and transmitting said radio frequency signal to a receiver via an antenna, using power generated by said power generating step.

13. The method of claim 12, and further comprising the step of switching to a second sensor and repeating said converting and transmitting steps, using power generated by said power generating step.

14. The method of claim 12, and further comprising the step of offsetting the magnetic force on said slug to reduce to inertial force required to move said slug.

15. The power generator of claim 4, wherein said cap portion is separated from said magnetic circuit by an air gap, which is opened and closed so as to cause said slug to make or break contact with said magnetic circuit as said slug moves.

16. The power generator of claim 4, wherein slug is stopped at one end by an end plate and said cap portion is at the impact end of said slug.

17. The power generator of claim 7, wherein said slug has an enlarged cap portion extending outside said coil, and wherein said cap portion is separated from said magnetic circuit by an air gap, which is opened and closed so as to cause said slug to make or break contact with said magnetic circuit as said slug moves.

18. The power generator of claim 17, wherein slug is stopped at one end by an end plate and said cap portion is at the impact end of said slug.

19. The measuring device of claim 7, and further comprising a plurality of said sensors and wherein said power generator generates an asymmetrical positive and negative voltage output, and further comprising a multiplexer for selecting among said sensors wherein said multiplexer is powered by said asymmetrical voltage output.

20. The power generator of claim 11, wherein said slug has an enlarged cap portion extending outside said coil, and wherein said cap portion is separated from said magnetic circuit by an air gap, which is opened and closed so as to cause said slug to make or break contact with said magnetic circuit as said slug moves.

21. The method of claim 13, wherein said generating step produces an asymmetrical voltage output and wherein said switching step uses said asymmetrical output to bias switching transistors.

* * * * *